(12) United States Patent
Ikemoto

(10) Patent No.: US 10,634,277 B2
(45) Date of Patent: Apr. 28, 2020

(54) STAND AND TELEVISION APPARATUS

(71) Applicant: SHARP KABUSHIKI KAISHA, Sakai, Osaka (JP)

(72) Inventor: Masao Ikemoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/079,062

(22) PCT Filed: Feb. 7, 2017

(86) PCT No.: PCT/JP2017/004438
§ 371 (c)(1),
(2) Date: Aug. 22, 2018

(87) PCT Pub. No.: WO2017/179275
PCT Pub. Date: Oct. 19, 2017

(65) Prior Publication Data
US 2019/0040992 A1    Feb. 7, 2019

(30) Foreign Application Priority Data

Apr. 15, 2016 (JP) .................... 2016-082024
Jan. 23, 2017 (JP) .................... 2017-009451

(51) Int. Cl.
*F16M 11/08* (2006.01)
*G09F 9/00* (2006.01)
*H04N 5/64* (2006.01)

(52) U.S. Cl.
CPC .............. *F16M 11/08* (2013.01); *G09F 9/00* (2013.01); *F16M 2200/08* (2013.01); *H04N 5/64* (2013.01)

(58) Field of Classification Search
CPC ...... F16M 11/08; F16M 2200/08; G09F 9/00; H04N 5/64
USPC .......................................................... 348/836
See application file for complete search history.

(56) References Cited

U.S. PATENT DOCUMENTS

| 2006/0022108 | A1* | 2/2006 | Kuga ..................... F16M 11/18 248/422 |
| 2008/0117342 | A1* | 5/2008 | Ueno ..................... F16M 11/08 348/836 |
| 2008/0134823 | A1* | 6/2008 | Uemura .................. H04N 5/64 74/434 |

(Continued)

FOREIGN PATENT DOCUMENTS

| JP | H06-341395 A | 12/1994 |
| JP | 2008-109407 A | 5/2008 |

(Continued)

*Primary Examiner* — Marnie A Matt
(74) *Attorney, Agent, or Firm* — ScienBiziP, P.C.

(57) ABSTRACT

A stand and a television apparatus capable of reducing limitations in design with respect to a base section are provided. A stand used for holding a display apparatus is provided. The stand includes a base section and a support section configured to rotate with respect to the base section and hold the display apparatus. The support section includes a drive unit configured to rotate a display screen of the display apparatus, and the drive unit is provided behind a back side of the display screen of the display apparatus. Preferably, the drive unit includes an electric motor and the display screen of the display apparatus is rotated by driving the electric motor.

7 Claims, 11 Drawing Sheets

(56) References Cited

U.S. PATENT DOCUMENTS

2008/0151483 A1* 6/2008 Holbrook .............. F16M 11/10
361/679.01
2009/0272870 A1* 11/2009 Asakura ................ F16M 11/10
248/550

FOREIGN PATENT DOCUMENTS

| JP | 2010-243871 A | 10/2010 |
|----|---------------|---------|
| JP | 5128994 B2 | 1/2013 |

* cited by examiner

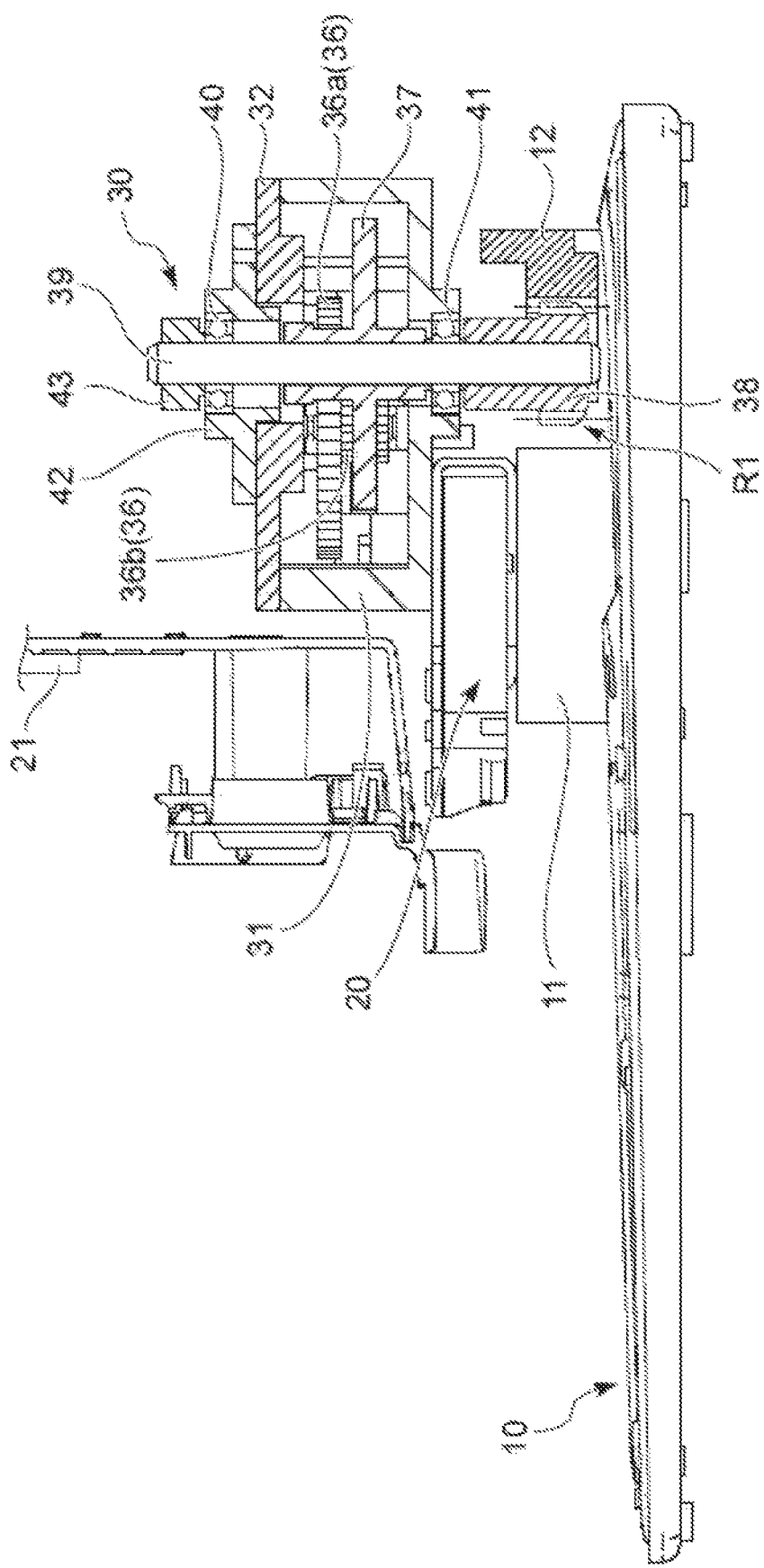

FIG.9A
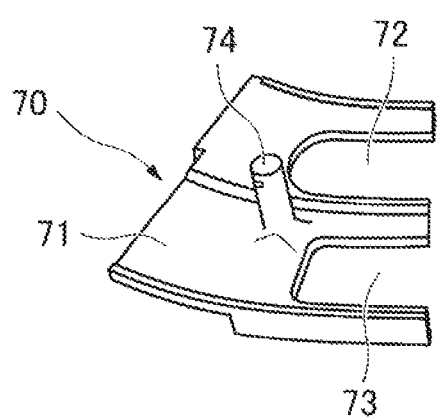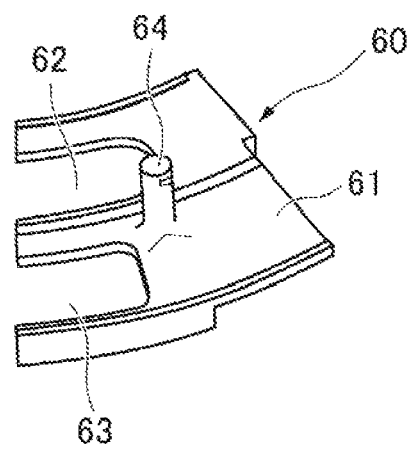
FIG.9B
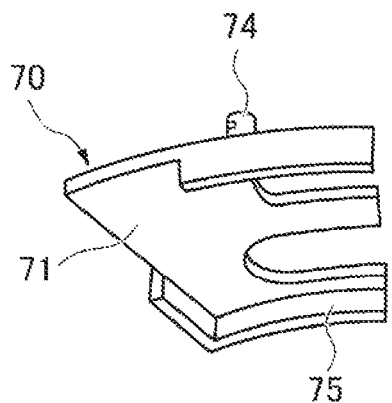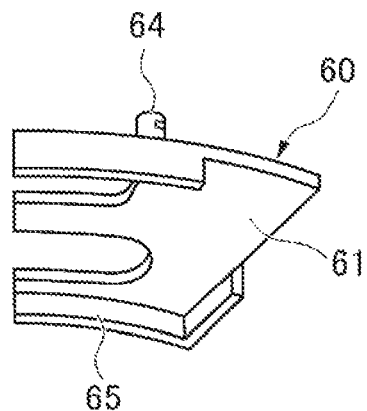

STAND AND TELEVISION APPARATUS

TECHNICAL FIELD

The present invention relates to a stand and a television apparatus, and more particularly, relates to a stand that is used to hold a display apparatus and a television apparatus.

BACKGROUND ART

Such a stand is attached to, for example, a lower part of a flat-screen display apparatus such as a television and a monitor to hold the display apparatus.

Consumers have been increasingly demanding a function (referred to as a swivel function) of changing the orientation of a display screen of a display apparatus, for example, from side to side so that the display screen faces the viewer irrespective of the size of the display screen, and whether the swivel function is provided or not will be a key factor for consumers in determining whether to buy or not to buy the display apparatus. For example, PTLs 1 and 2 disclose the techniques for stands that have the swivel function.

CITATION LIST

Patent Literature

PTL 1: Japanese Unexamined Patent Application Publication No. 2010-243871
PTL 2: Japanese Patent No. 5128994

SUMMARY OF INVENTION

Technical Problem

The stands described in PTLs 1 and 2 above, however, are provided on base sections where their drive units having motors and other components for rotating display screens of the display apparatuses are immovable. Accordingly, the positions of the display screens with respect to the base sections are high in some cases, which may limit design freedom to the base sections.

The present invention has been made in view of the above, and it is an object of the invention to provide a stand and a television apparatus capable of reducing limitations in design with respect to a base section.

Solution to Problem

To solve the above-described problems, first technical means of the present invention provides a stand used for holding a display apparatus. The stand includes a base section, and a support section configured to rotate with respect to the base section and hold the display apparatus. The support section includes a drive unit configured to rotate a display screen of the display apparatus, and the drive unit is provided behind a back side of the display screen of the display apparatus.

Second technical means provides the stand according to the first technical means, in which the drive unit includes an electric motor and the display screen of the display apparatus is rotated by driving the electric motor.

Third technical means provides the stand according to the first or second technical means, in which the drive unit includes a drive shaft, and a movable gear configured to rotate together with the drive shaft, the base section includes a rotation supporting member configured to support rotatably the display apparatus and a fixed gear configured to mesh with the movable gear, and the movable gear is disposed between the rotation supporting member and the fixed gear.

Fourth technical means provides the stand according to the third technical means, in which the movable gear is provided at a lower end of the drive shaft that extends downward through the drive unit, and at least a lower end side of the movable gear has an arc shape in a cross section passing through the rotation axis line of the drive shaft.

Fifth technical means provides the stand according to the first or second technical means, in which the drive unit includes a drive shaft, and a movable gear configured to rotate together with the drive shaft, the base section includes a rotation supporting member configured to support rotatably the display apparatus and a fixed gear configured to mesh with the movable gear, and the fixed gear is disposed between the rotation supporting member and the movable gear.

Sixth technical means provides the stand according to the fifth technical means, in which the movable gear is provided at a lower end of the drive shaft that extends downward through the drive unit, and at least an upper end side of the movable gear has an arc shape in a cross section passing through the rotation axis line of the drive shaft.

Seventh technical means provides the stand according to any one of the first to sixth technical means, in which the drive unit includes a drive shaft, a movable gear configured to rotate together with the drive shaft, and a unit base through which the drive shaft is disposed, the unit base being configured to rotate to rotate the display screen of the display apparatus, the base section includes a fixed gear configured to mesh with the movable gear and a dustproof box that accommodates the movable gear and the fixed gear, and further includes two slide covers each configured to move in conjunction with rotation of the unit base, when one of the slide covers moves in conjunction with the rotation of the unit base and covers the dustproof box, another one of the slide covers covers the dustproof box without moving in conjunction with the rotation of the unit base.

Eighth technical means provides a television apparatus that includes the technical means according to any one of the first to seventh technical means.

Advantageous Effects of Invention

According to the invention, a drive unit is provided on a support section, and thus design limitations with respect to a base section can be reduced. Furthermore, the drive unit is disposed behind a back side of the display apparatus such that the drive unit becomes less visible from a front side of the display apparatus. Consequently, a display apparatus with a stand having a high degree of flexibility in design can be provided.

BRIEF DESCRIPTION OF DRAWINGS

FIG. 4 is a partial cross-sectional view illustrating a stand.

FIG. 9A is an external perspective view of a first slide cover and a second slide cover.

FIG. 9B is an external perspective view of a first slide cover and a second slide cover.

DESCRIPTION OF EMBODIMENTS

First Embodiment

Figure 1:
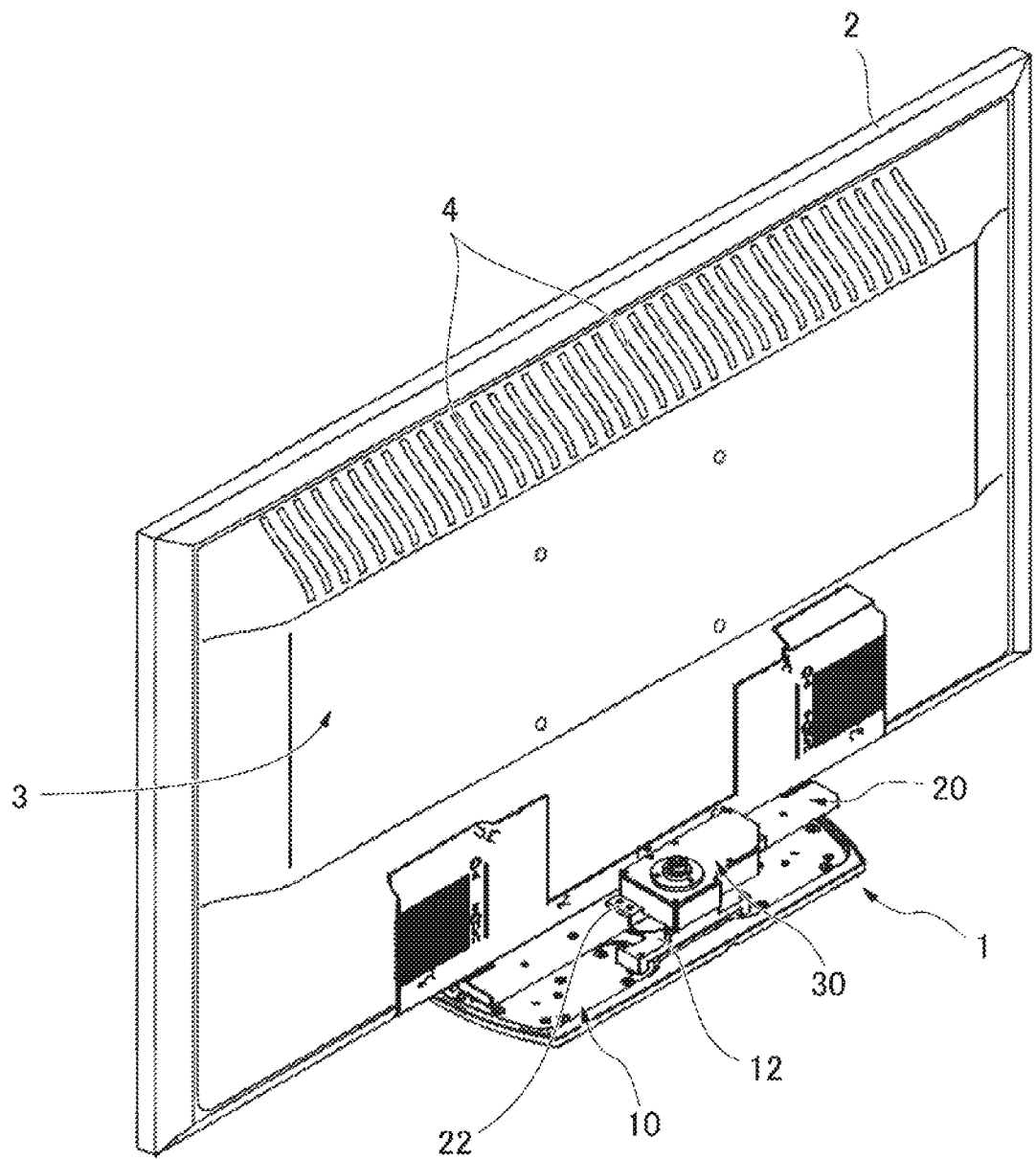
FIG. 1 is a perspective view illustrating a display apparatus with a stand according to an embodiment of the invention.

FIG. 1 is a perspective view illustrating a display apparatus with a stand according to an embodiment of the invention. A stand 1 according to the embodiment has a one-leg structure and is attached to a lower section in a center (also referred to as a panel center) of a display apparatus (for example, a flat-screen television) 2. In FIG. 1, the display apparatus 2 is viewed diagonally from the left back. On a back surface 3 of the display apparatus 2, for example, a plurality of heat radiation holes 4 are provided.

The display apparatus 2 is rotated in the horizontal direction by a swivel mechanism in the stand 1 to change the orientation of the display screen. A structure and operation of the stand 1 will be described below in detail.

Figure 2:
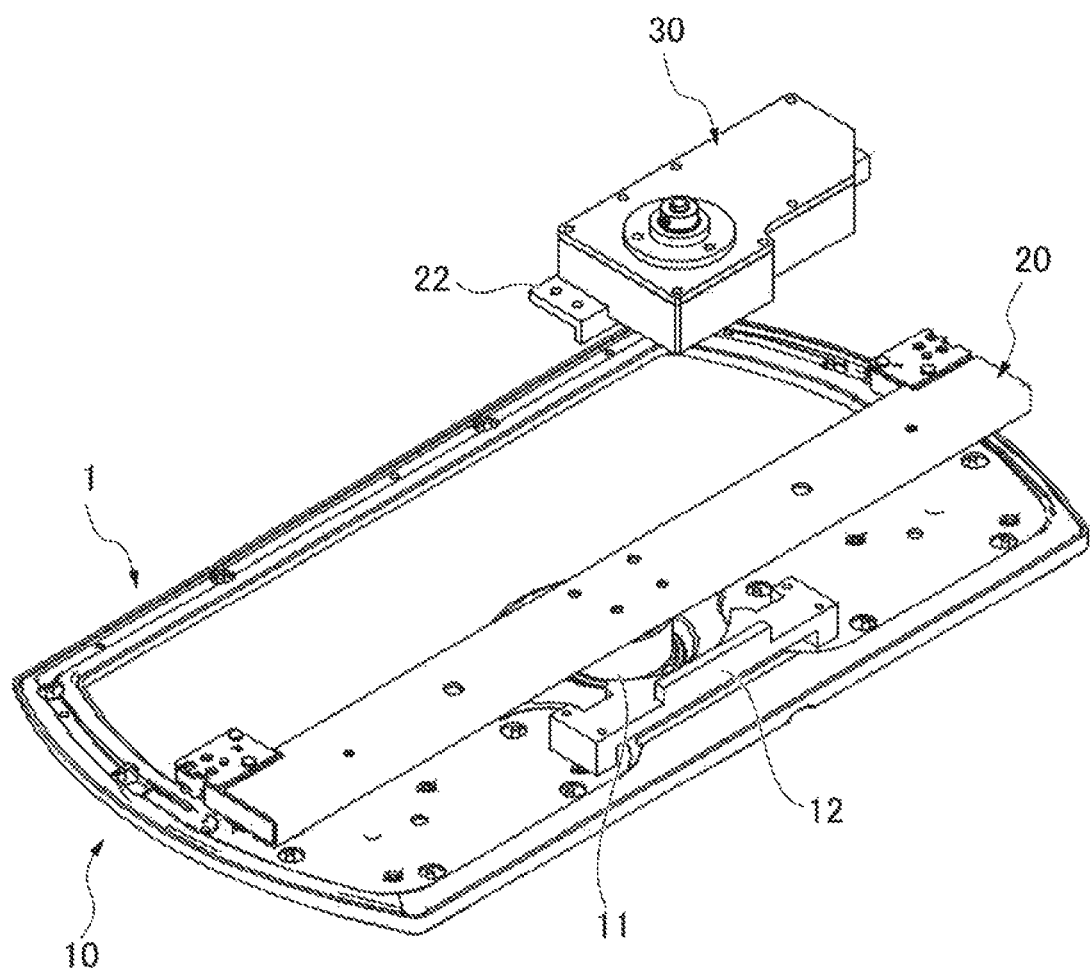
FIG. 2 is an exploded perspective view illustrating a stand.

FIG. 2 is an exploded perspective view illustrating a stand. The stand 1 includes a base section (also referred to as a stand base) 10 and a support section (also referred to as a stand support) 20. The base section 10 and the support section 20 are made of, for example, resin.

The base section 10 includes a rotation supporting member 11 at a position corresponding to the panel center. A front side of the display apparatus, that is, a front side of the rotation supporting member 11 is, for example, open to have a frame shape, and a back side of the rotation supporting member 11 is closed to have a plate shape.

The rotation supporting member 11 is, for example, a cylindrical metallic member, and, for example, can rotate with respect to the base section 10. Although the rotation supporting member 11 in the drawing is disposed upright with respect to the base section 10, the rotation supporting member 11 may be inclined with respect to the base section 10. The rotation supporting member 11 may be a fixed shaft or a member that supports a rotating shaft as long as the rotation supporting member 11 can support rotatably the display apparatus.

The base section 10 includes a fixed gear 12, which will be described below, behind the rotation supporting member 11. The fixed gear 12 is made of, for example, carbon steel, and has teeth on the side facing the rotation supporting member 11. The fixed gear 12 is fixed to the base section 10, for example, with a screw.

The support section 20 has, for example, an elongated plate shape, and can be rotated together with the rotation supporting member 11. The support section 20 includes, for example, a support base 21 as illustrated in FIG. 4 at a position slightly close to the front side with respect to the rotation center of the rotation supporting member 11 in the depth direction (the front-back direction of the display apparatus) of the base section 10 so as to hold the display apparatus 2.

The support section 20 also includes a drive unit 30. Specifically, the drive unit 30 is provided behind the support base 21 and is fixed to the support section 20 via an installation plate 22, for example, with a screw.

As described above, the drive unit 30 is provided not on the base section 10 but on the support section 20, and thus design limitations with respect to the base section 10 can be reduced. Furthermore, the drive unit 30 is disposed behind the back side of the display apparatus such that the drive unit 30 becomes less visible from the front side of the display apparatus. Consequently, a display apparatus with a stand having a high degree of flexibility in design can be provided.

Figure 3A:
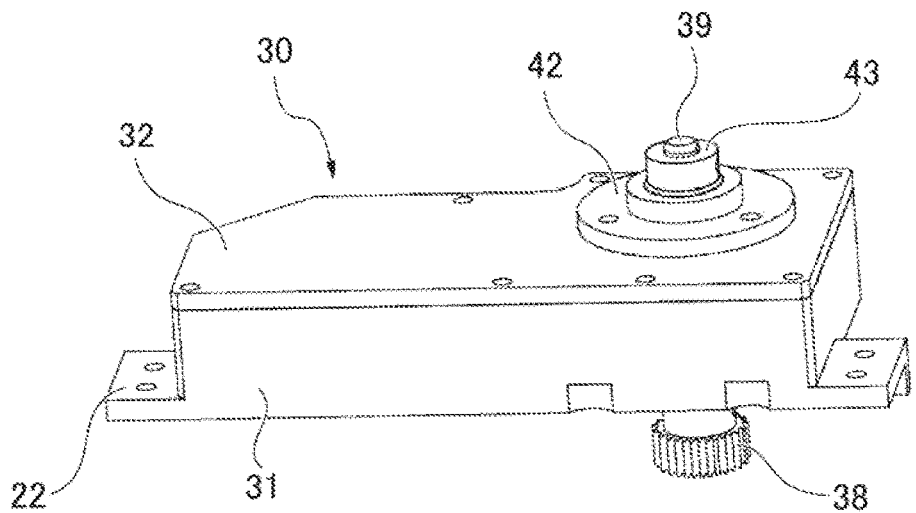
FIG. 3A is a perspective view of a drive unit.
Figure 3B:
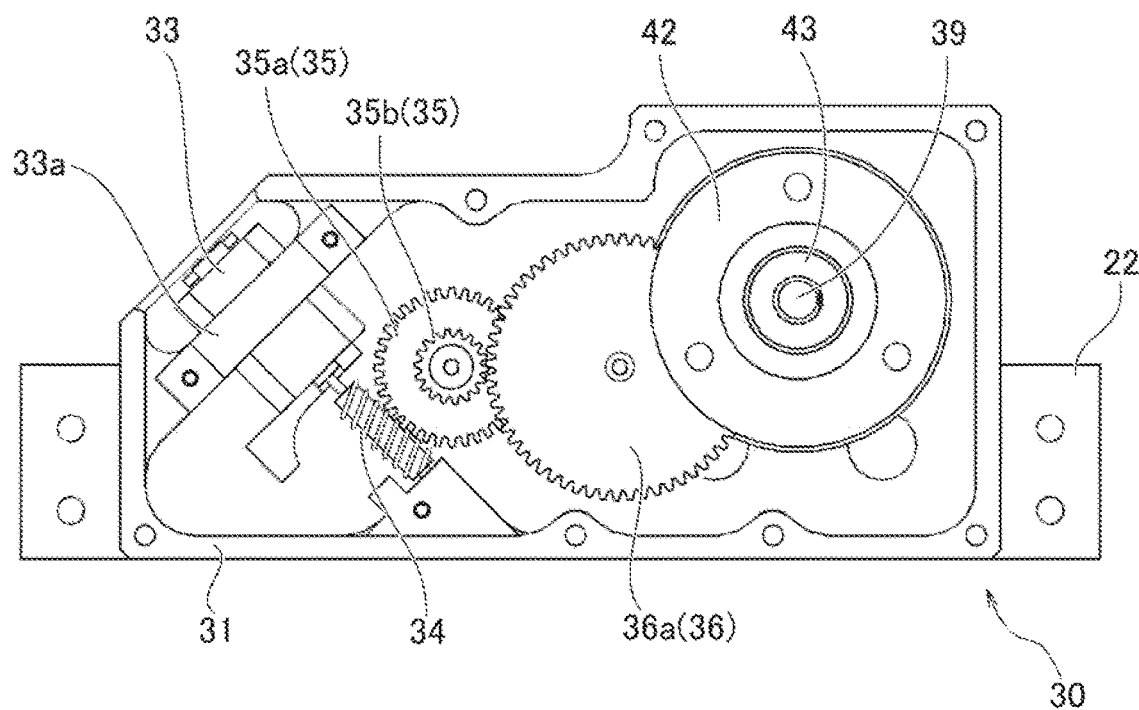
FIG. 3B is a plan view of a drive unit.

FIG. 3A is a perspective view of a drive unit and FIG. 3B is a plan view of a drive unit. FIG. 4 is a partial cross-sectional view illustrating a stand.

FIG. 3A illustrates a drive unit viewed from a front side of a display apparatus. A lower side in FIG. 3B corresponds to the front side of the display apparatus. In FIG. 3B, a unit cover 32, which will be described below, is omitted to describe an internal structure of the drive unit. In FIG. 4, cross sections of the fixed gear 12 on the base section 10 and the drive unit 30 are illustrated.

As illustrated in FIG. 3A, the drive unit 30 includes a cup-shaped unit base 31, accommodates an electric motor 33, a gear train, and a drive shaft 39, which will be described below, and is covered by the plate-like unit cover 32. The unit base 31 and the unit cover 32 are made of, for example, aluminum. The unit base 31 in the drawing and the installation plate 22 are integrated into a unit; however, the unit base 31 and the instillation plate 22 may be separately provided.

As illustrated in FIG. 3B, the electric motor 33 is fixed to the unit base 31, for example, with a screw via a motor holder 33a that is made of, for example, aluminum. The electric motor 33 is, for example, an alternating current (AC) servo motor that can control its rotation amount, rotation direction, and rotation speed. The electric motor 33 can rotate a worm gear 34 made of, for example, resin, that is installed on the rotation shaft of the electric motor 33 in forward and reverse directions in accordance with a drive signal from a controller (not illustrated).

In the vicinity of the electric motor 33, a first gear 35 made of, for example, carbon steel is provided. The first gear 35 includes a first large-diameter gear 35a that meshes with the worm gear 34 and a first small-diameter gear 35b that is integrally formed on an upper side of the first large-diameter gear 35a. The first gear 35 is rotatably supported with respect to the unit base 31 and the unit cover 32.

In the vicinity of the first gear 35, a second gear 36 made of, for example, carbon steel is provided. The second gear 36 includes a second large-diameter gear 36a that meshes with the first small-diameter gear 35b and a second small-diameter gear 36b that is integrally formed on a lower side of the second large-diameter gear 36a as illustrated in FIG. 4. The second gear 36 is rotatably supported with respect to the unit base 31 and other components.

The drive shaft 39 is made of, for example, carbon steel and is provided in the vicinity of the second gear 36. Specifically, the drive shaft 39 protrudes above the unit cover 32 and also protrudes below the unit base 31 as illustrated in FIG. 4, and is rotatably supported with respect to the unit base 31 and other components with bearings 40 and 41.

The bearing 40 is held by a bearing holder 42 made of, for example, aluminum, provided on the unit cover 32, and is fixed with a collar 43 made of, for example, carbon steel. The bearing 41 is provided in the unit base 31.

On the drive shaft 39, a third gear 37 made of, for example, carbon steel and a movable gear 38 similarly made of, for example, carbon steel are provided. The third gear 37 and the movable gear 38 can be rotated together with the drive shaft 39.

The third gear 37 is accommodated in the unit base 31 and meshes with the second small-diameter gear 36b described in FIG. 4.

The movable gear 38 is provided on the drive shaft 39 concentrically with the third gear 37. The movable gear 38 is located at a lower end of the drive shaft 39 and meshes with the fixed gear 12 on the base section 10 below the unit base 31, that is, outside the drive unit 30.

As illustrated in FIG. 4, the movable gear 38 is disposed between the rotation supporting member 11 and the fixed gear 12.

As described above, the movable gear 38 that is disposed between the rotation supporting member 11 and the fixed gear 12 enables the base section 10 to save the space necessary for the depth of the base section 10 as compared to a case in which the fixed gear is disposed between the rotation supporting member and the movable gear.

The lower end of the movable gear 38 has an arc shape (also referred to as a chamfered section R1) in a cross section passing through the rotation axis line of the drive shaft 39 as illustrated in FIG. 4.

As described above, for example, the support base 21 is disposed at a position closer to the front side than the rotation center of the rotation supporting member 11, and accordingly, the display apparatus tends to be inclined forward. However, the movable gear 38 that has the arc-shaped lower end enables the movable gear 38 and the fixed gear 12 to maintain smooth meshing even if the upper end of the drive shaft 39 is inclined forward as the display apparatus is inclined forward, and thus the reliability of the swivel function can be increased.

Figure 5A:
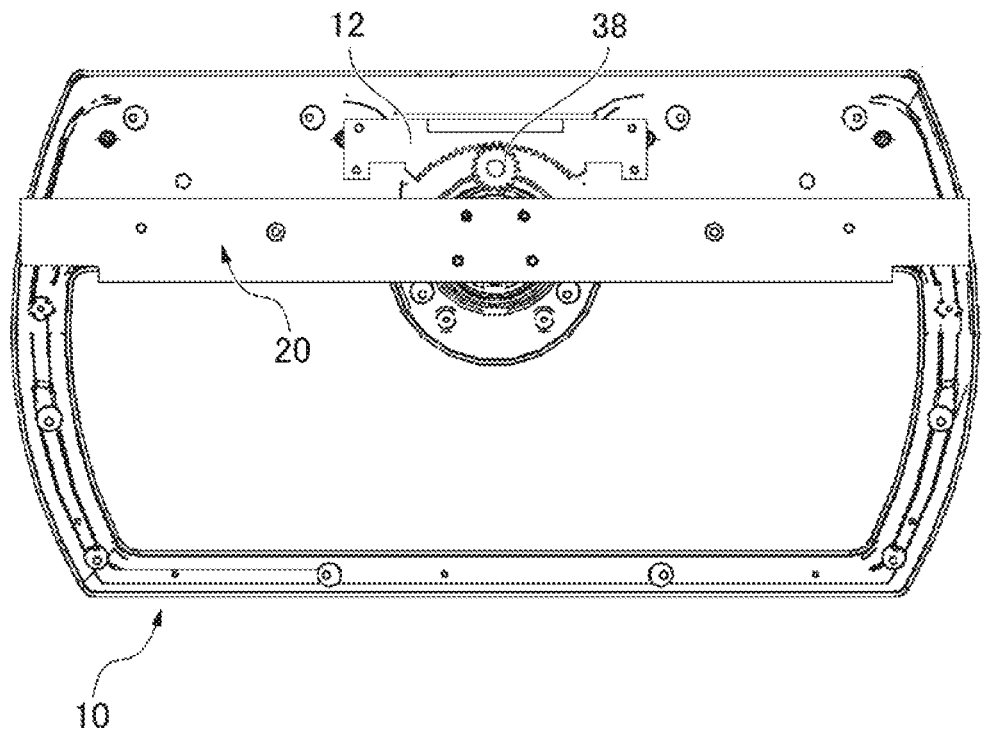
FIG. 5A illustrates the operation of a stand.
Figure 5B:
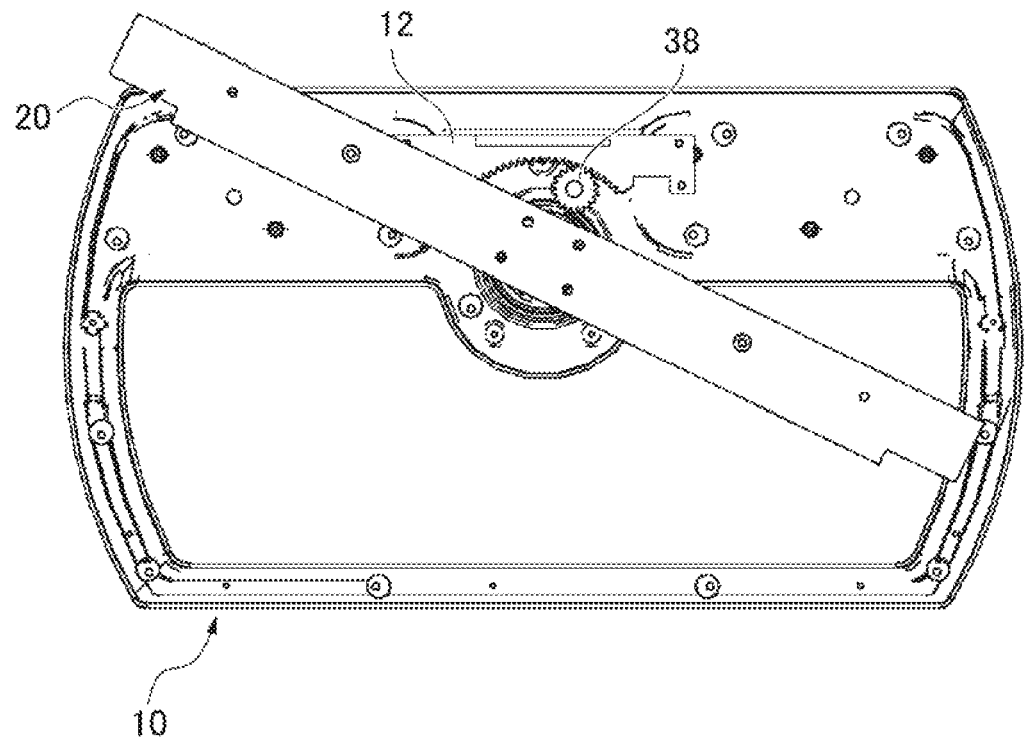
FIG. 5B illustrates the operation of a stand.

FIG. 5A and FIG. 5B illustrates the operation of a stand. In FIG. 5A and FIG. 5B, the display apparatus and some components are omitted to describe the relationship between the fixed gear 12 on the base section 10 and the movable gear 38 of the drive unit 30.

For example, as illustrated in FIG. 5A, the movable gear 38 is located approximately in the center of the fixed gear 12 and the display screen of the display apparatus faces the front.

As the electric motor 33 described in FIG. 3B is driven, the first gear 35, the second gear 36, and the third gear 37 are rotated in this order, and when the drive shaft 39 is rotated, for example, in the counterclockwise direction in plan view, as illustrated in FIG. 5B, the movable gear 38 is rotated within the range in which the teeth of the fixed gear 12 are provided, one end (the right end of the support section 20 in FIG. 5B) of the support section 20 is moved forward, and thereby the orientation of the display screen is changed to the left.

The electric swivel function enables users to rotate the display screen of the display apparatus by remote control, for example, with the spread of the Internet of Things (IoT).

Second Embodiment

Figure 6:
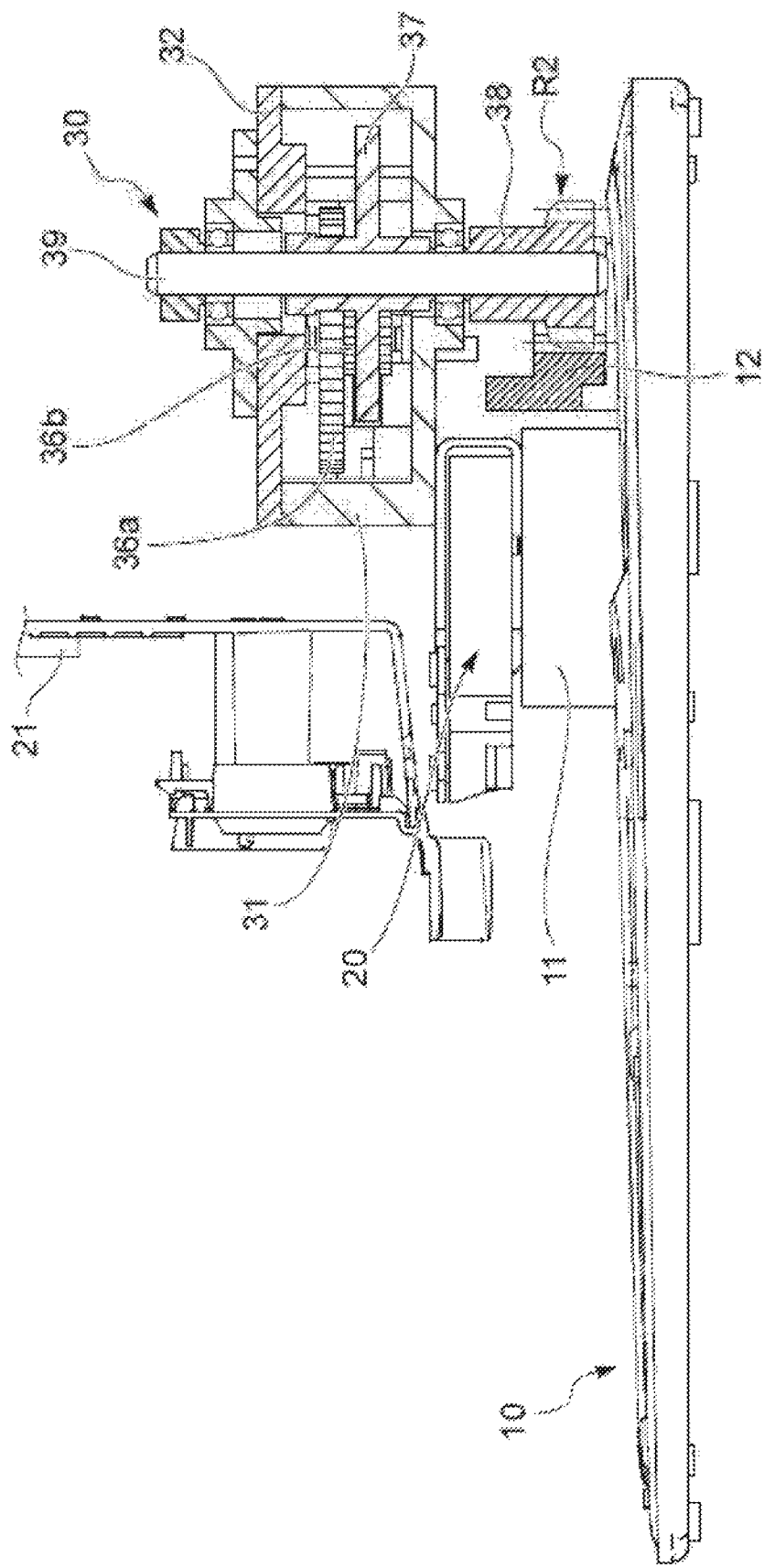
FIG. 6 illustrates another embodiment of the stand.

FIG. 6 illustrates another embodiment of the stand. In FIG. 6, cross sections of the fixed gear 12 on the base section 10 and the drive unit 30 are illustrated similarly to FIG. 4.

In the second embodiment, similarly to the above-described first embodiment, the base section 10 includes the fixed gear 12 behind the rotation supporting member 11; however, the fixed gear 12 in the second embodiment is disposed between the rotation supporting member 11 and the movable gear 38 of the drive unit 30 as illustrated in FIG. 6.

The fixed gear 12 that is disposed between the rotation supporting member 11 and the movable gear 38 increases the distance from the back side of the display apparatus to the drive unit in the depth direction of the base section 10 as compared to the distance in the structure in which the movable gear is disposed between the rotation supporting member and the fixed gear, and thus the stability of the display apparatus can be increased.

In this case, an upper end of the movable gear 38 has an arc shape (also referred to as a chamfered section R2) in a cross section passing through the rotation axis line of the drive shaft 39 as illustrated in FIG. 6.

With this structure in which the upper end of the movable gear 38 has the arc shape, even if the display apparatus tends to be inclined forward, the smooth meshing of the movable gear 38 and the fixed gear 12 can be maintained and thus the reliability of the swivel function can be increased.

Third Embodiment

As described in the first embodiment, the lower end of the movable gear 38 has the arc shape, and in the second embodiment, the upper end of the movable gear 38 has the arc shape. Alternatively, both of the upper end and the lower end of the movable gear may have arc shapes in the side view.

Fourth Embodiment

Figure 7A:
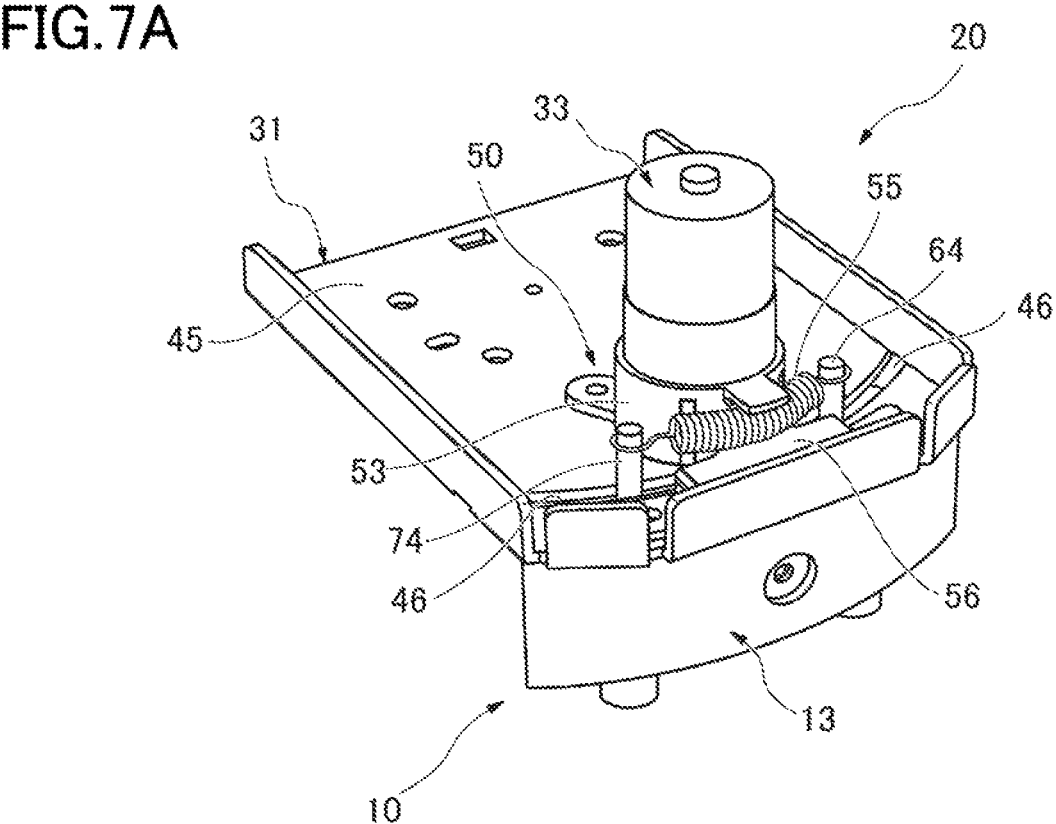
FIG. 7A is an external perspective view of a support section and a base section according to a fourth embodiment.
Figure 7B:
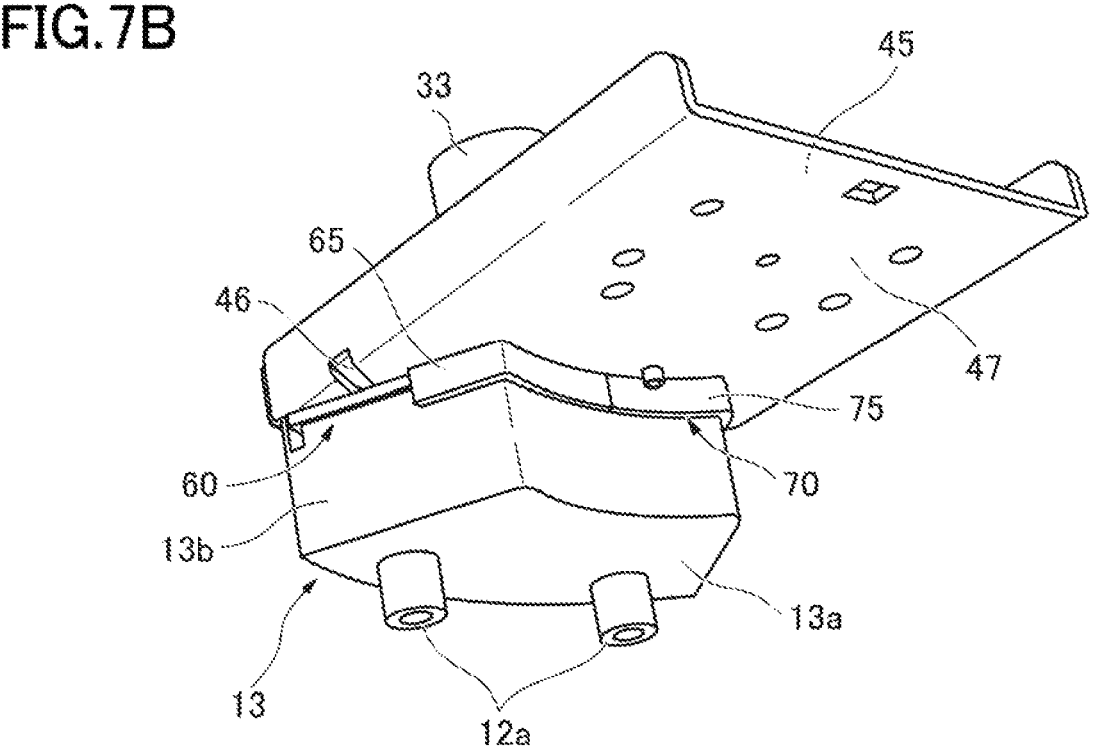
FIG. 7B is an external perspective view of a support section and a base section according to a fourth embodiment.
Figure 8:
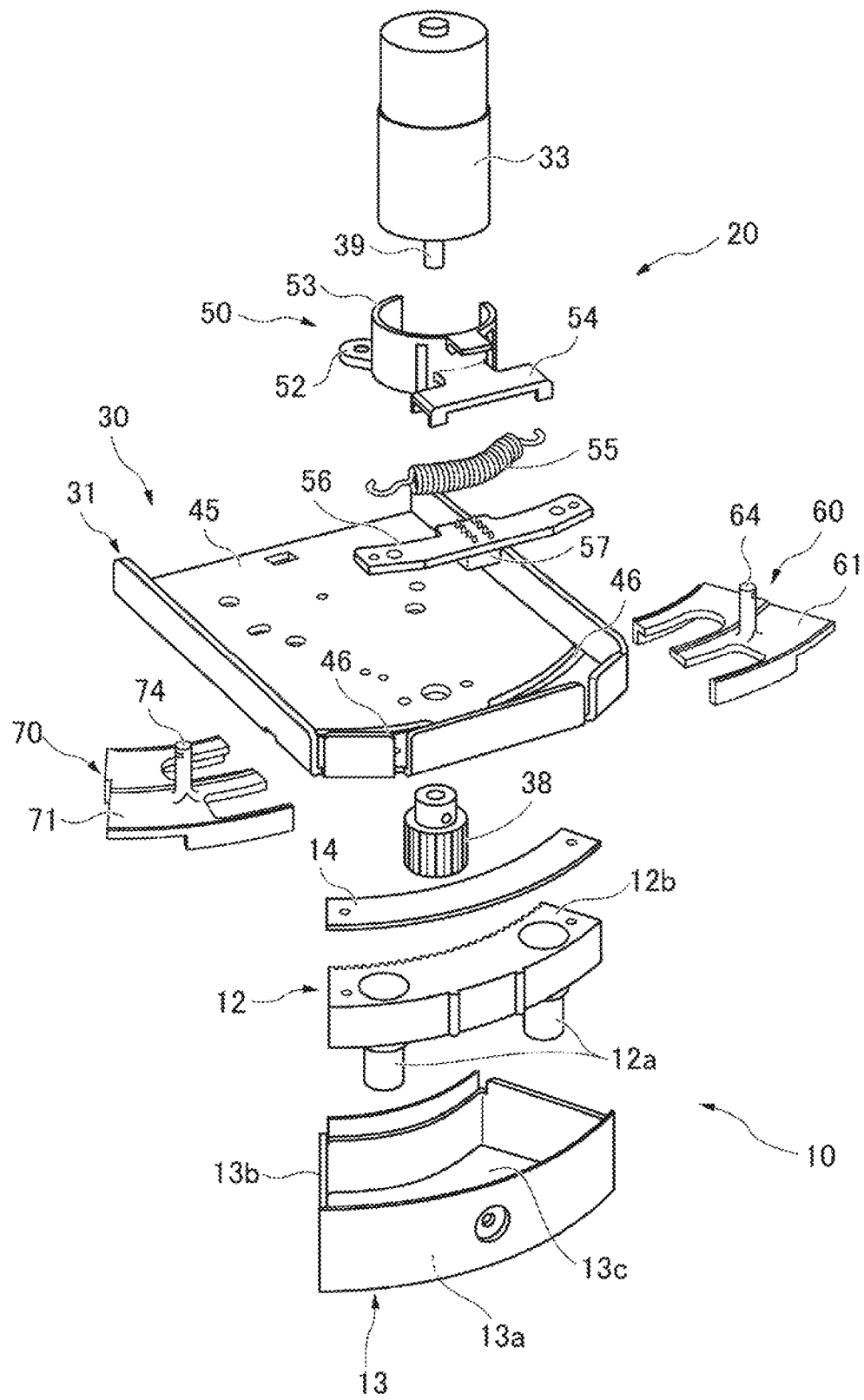
FIG. 8 is an exploded perspective view of a support section and a base section.
Figure 10:
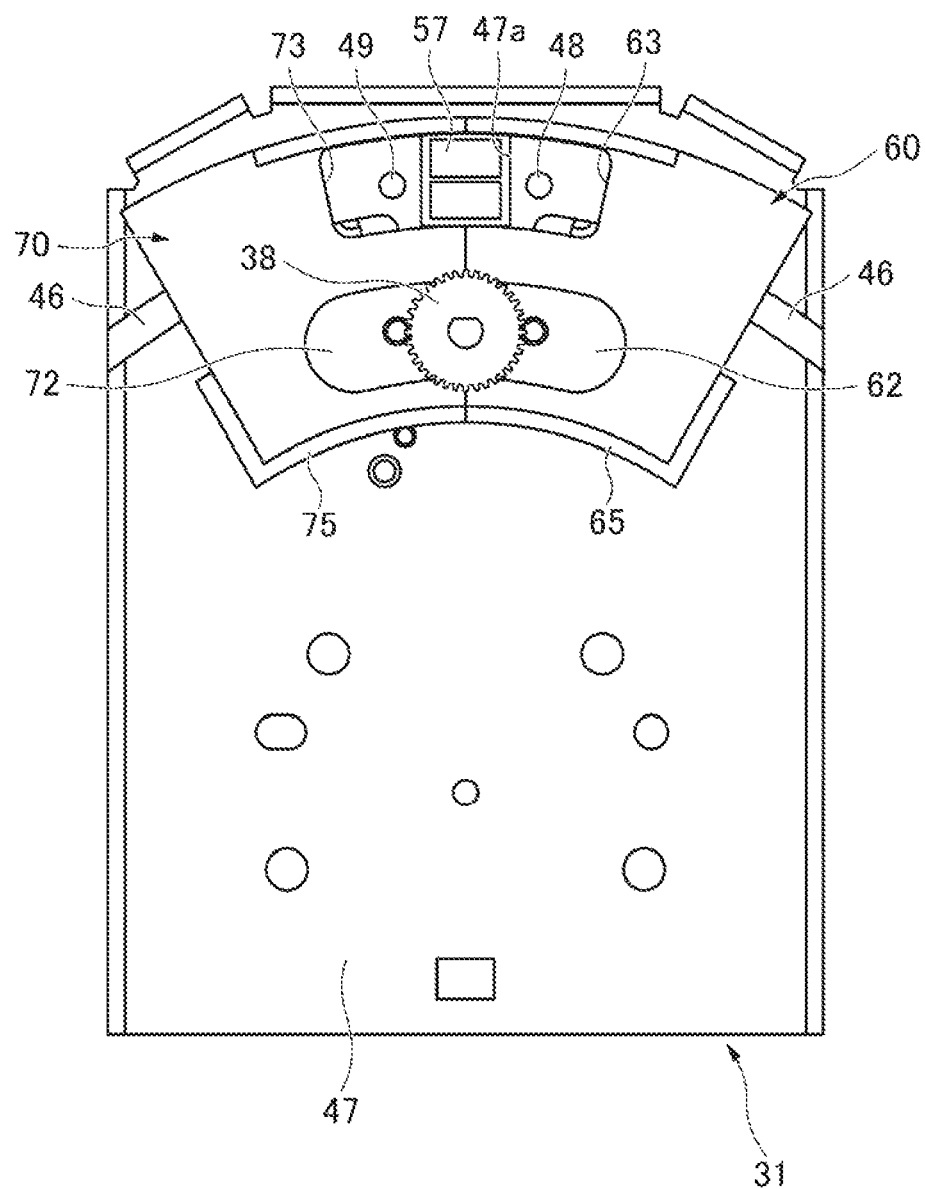
FIG. 10 is a back view of a support section.

The stand may have a dustproof structure. FIG. 7A and FIG. 7B is an external perspective view of a support section and a base section according to the fourth embodiment. FIG. 8 is an exploded perspective view of a support section and a base section. FIG. 9A and FIG. 9B is an external perspective view of a first slide cover and a second slide cover. FIG. 10 is a back view of a support section.

FIG. 7 illustrates the support section 20 and the base section 10 viewed diagonally from the left back. The base section 10 includes the movable gear 38 and a dustproof box 13 that can accommodate the fixed gear 12 and a position detection plate 14 illustrated in FIG. 8. The dustproof box 13 is disposed behind the rotation supporting member 11 described in FIG. 2. As illustrated in FIG. 8, the dustproof box 13 has, for example, a cup shape. The dustproof box 13 has, in an upper part, an upper opening 13c for accepting the movable gear 38 and the fixed gear 12, and an upright side surface 13b around the upper opening 13c. At a lower end of the side surface 13b, a lower surface 13a into which leg sections 12a of the fixed gear 12 can be inserted is provided.

The fixed gear 12 includes a trapezoidal section 12b on upper parts of the leg sections 12a, and a side surface of the trapezoidal section 12b has teeth that mesh with the movable gear 38. The position detection plate 14 is disposed on an upper surface of the trapezoidal section 12b. The position detection plate 14 has marks of white or silver at positions corresponding to, for example, a central position, a position of 15 degrees left, and a position of 15 degrees right.

The drive unit 30 of the support section 20 includes the plate-like unit base 31. A lower surface 47 of the unit base 31 illustrated in FIG. 7B is, for example, directly connected to the upper surface of the rotation supporting member 11 and can be rotated integrally with the rotation supporting member 11. To an upper surface 45 of the unit base 31, the support base 21 described in FIG. 4 can be fixed.

As illustrated in FIG. 7A, FIG. 7B, and FIG. 10, the unit base 31 has openings 46 for a curved slide cover that extend through the upper surface 45 and the lower surface 47. The openings 46 can accept an upward protrusion 64 of a first slide cover 60 and an upward protrusion 74 of a second slide cover 70 illustrated in FIG. 8 and FIG. 9, for example, from below.

As illustrated in FIG. 10, the unit base 31 includes an opening 47a for a rectangular photosensor on behind the openings 46 for the slide cover. The opening 47a also extends through the upper surface 45 and the lower surface 47. On the right and left sides of the photosensor opening 47a, half punch sections 48 and 49 are provided. The half punch section 48 is on the right side of the photosensor opening 47a in FIG. 10, protrudes downward from the lower surface 47 of the unit base 31, and can be brought into contact with an end portion of an opening 63 of the first slide cover 60. The half punch section 49 is on the left side of the photosensor opening 47a in FIG. 10, protrudes downward from the lower surface 47 of the unit base 31, and can be brought into contact with an end portion of an opening of the second slide cover 70.

As illustrated in FIG. 8, the drive shaft 39 is rotatably supported with respect to the electric motor 33. To the lower end of the drive shaft 39, the movable gear 38 is provided and the movable gear 38 meshes with the fixed gear 12 below the unit base 31. The electric motor 33 is fixed to the upper surface 45 of the unit base 31 with a substantially cylindrical spring guide ring 50.

The spring guide ring 50 includes a guide section 53 that guides the electric motor 33 on the inner surface and guides a tension spring 55 on the outer surface in a central section of the guide section 53, a center hole (not illustrated) through which the drive shaft 39 is inserted is provided. On a front side of the guide section 53, a fixing section 52 for fixing the spring guide ring 50 onto the upper surface 45 of the unit base 31, for example, with a screw is provided. On a back side of the guide section 53, a pressing section 54 for pressing a printed circuit board 56 downward is provided.

The tension spring 55 returns the first and second slide covers 60 and 70 that have been separated in two parts to original positions. One end of the tension spring 55 is attached to the upward protrusion 64 of the first slide cover 60 and the other end is attached to the upward protrusion 74 of the second slide cover 70 respectively.

In a central section on a back side of the printed circuit board 56, a photosensor 57 is disposed, and the printed circuit board 56 is pressed from above by the pressing section 54 of the spring guide ring 50 and fixed to the upper surface 45 of the unit base 31.

The photosensor 57 can emit light toward the position detection plate 14 that is located below the photosensor 57. By detecting the light reflected from the marks of white or silver on the position detection plate 14 with the photosensor 57, a position of the rotated drive unit 30 can be obtained.

The first slide cover 60 is on the left side in plan view, and the second slide cover 70 is on the right side in plan view. The first slide cover 60 and the second slide cover 70 each can move in conjunction with the rotation of the unit base 31.

As illustrated in FIG. 9A, the first slide cover 60 has a horizontal surface section 61 that covers the upper opening 13c of the dustproof box 13 illustrated in FIG. 8. The upward protrusion 64 protrudes upward from the upper surface of the horizontal surface section 61 and is capable of holding an end portion of the tension spring 55. On a front side of the upward protrusion 64, a curved drive-shaft opening 62 that accepts the drive shaft 39 is provided and on a back side of the upward protrusion 64, a curved photosensor opening 63 that accepts the photosensor 57 is provided.

The first slide cover 60 is disposed below the unit base 31, and the upward protrusion 64 is loosely fitted into the slide-cover opening 46 from below the unit base 31 to protrude above the unit base 31.

As illustrated in FIG. 9B, the first slide cover 60 has an L-shaped downward protruding piece 65. The downward protruding piece 65 protrudes from a front end of the horizontal surface section 61 toward a side end, and as illustrated in FIG. 7B, can be brought into contact with the side surface 13b of the dustproof box 13.

The second slide cover 70 has a horizontal surface section 71 that covers the upper opening 13c of the dustproof box 13 similarly to the first slide cover 60. The upward protrusion 74 protrudes upward from the upper surface of the horizontal surface section 71. On a front side of the upward protrusion 74, a curved drive-shaft opening 72 that accepts the drive shaft 39 is provided and on a back side of the upward protrusion 74, a curved photosensor opening 73 that accepts the photosensor 57 is provided. The second slide cover 70 is also disposed below the unit base 31, and the upward protrusion 74 is loosely fitted into the slide-cover opening 46.

As illustrated in FIG. 9B, the second slide cover 70 has an L-shaped downward protruding piece 75 that protrudes from a front end of the horizontal surface section 71 toward a side end and can be brought into contact, with the side surface 13b of the dustproof box 13.

Figure 11A:
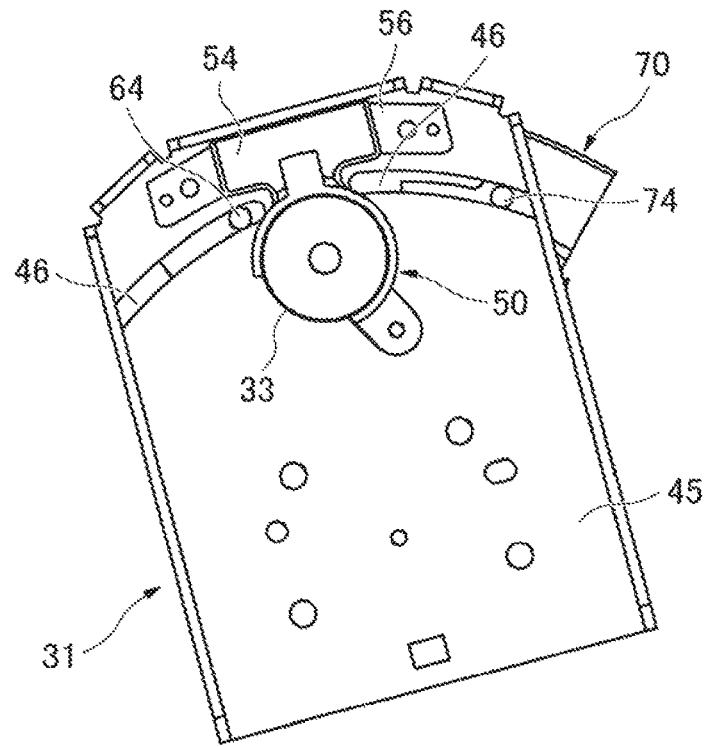
FIG. 11A illustrates the operation of a stand.
Figure 11B:
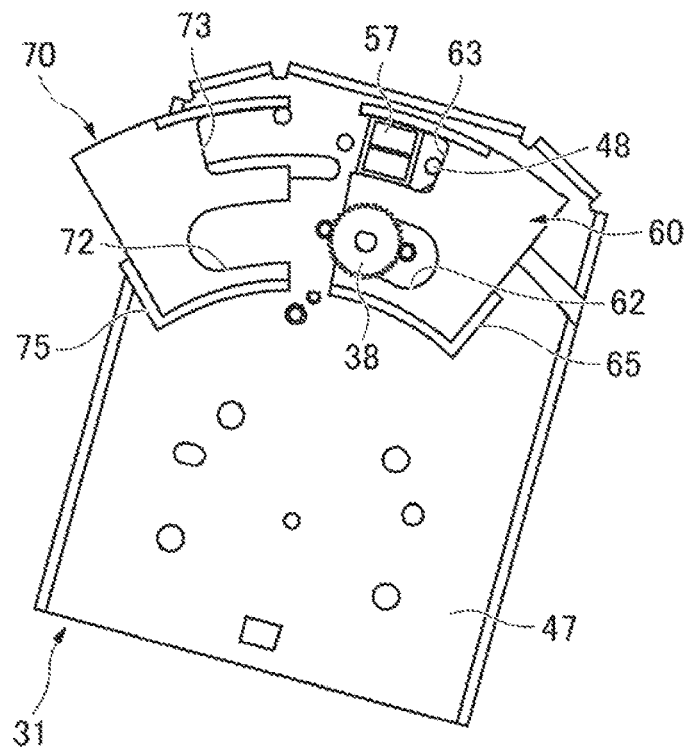
FIG. 11B illustrates the operation of a stand.

FIG. 11A and FIG. 11B illustrates the operation of a stand. In FIG. 11A and FIG. 11B, the display apparatus, the dustproof box 13, the tension spring 55, and other components are omitted to describe the relationship between the unit base 31 and the first and second slide covers 60 and 70.

The movable gear 38 is positioned approximately in the center of the fixed gear 12 and the display screen of the display apparatus faces the front. When the drive shaft 39 starts to rotate, for example, clockwise in plan view as the electric motor 33 is driven, one end (a left end of the unit base 31 in FIG. 11A) of the unit base 31 starts to move (rotate) forward.

After the one end of the unit base 31 starts to rotate, as illustrated in FIG. 11B, the half punch section 48 of the unit base 31 comes into contact with an end portion of the photosensor opening 63 in the first slide cover 60 to release the contact between the downward protruding piece 65 of the first slide cover 60 and the side surface 13b of the dustproof box 13. Then, the first slide cover 60 starts to rotate together with the unit base 31 against the urging force of the tension spring 55 while covering the upper opening 13c of the dustproof box 13.

On the other hand, when the first slide cover 60 moves in conjunction with the rotation of the unit base 31 and covers the upper opening 13c of the dustproof box 13, the contact between the downward protruding piece 75 of the second slide cover 70 and the side surface 13b of the dustproof box 13 is not released. Accordingly, as illustrated in FIG. 11B, even when the first slide cover 60 rotates together with the unit base 31, the second slide cover 70 continues to cover the upper opening 13c of the dustproof box 13 without rotation.

When the drive shaft 39 starts to rotate, for example, clockwise in plan view, as illustrated in FIG. 11A, the left end of the unit base 31 rotates to change the orientation of the display screen to the left.

Then, when the drive shaft 39 is rotated, for example, counterclockwise in plan view based on a detection result of the photosensor 57, one end (a right end of the unit base 31 in FIG. 11A) of the unit base 31 starts to move (rotate) forward.

After the one end of the unit base 31 starts to rotate, when the contact between the half punch section 48 and the end portion of the photosensor opening 63 is released, the first slide cover 60 starts to move toward the second slide cover 70 until the downward protruding piece 65 comes into contact with the side surface 13b of the dustproof box 13 by the urging force of the tension spring 55 while the first slide cover 60 covers the upper opening 13c of the dustproof box 13.

On the other hand, although not illustrated, when the movable gear 38 is positioned approximately in the center of the fixed gear 12 and the display screen of the display apparatus faces the front, if the drive shaft 39 starts to rotate, for example, counterclockwise in plan view as the electric motor 33 is driven, one end (a right end of the unit base 31 in FIG. 11A) of the unit base 31 starts to move (rotate) forward.

After the one end of the unit base 31 starts to rotate, the half punch section 49 of the unit base 31 comes into contact with an end portion of the photosensor opening 73 in the second slide cover 70 to release the contact between the downward protruding piece 75 of the second slide cover 70 and the side surface 13b of the dustproof box 13. Then, the second slide cover 70 starts to rotate together with the unit base 31 against the urging force of the tension spring 55 while covering the upper opening 13c of the dustproof box 13.

On the other hand, when the second slide cover 70 moves in conjunction with the rotation of the unit base 31 and covers the upper opening 13c of the dustproof box 13, the contact between the downward protruding piece 65 of the first slide cover 60 and the side surface 13b of the dustproof box 13 is not released. Accordingly, even when the second slide cover 70 rotates together with the unit base 31, the first slide cover 60 continues to cover the upper opening 13c of the dustproof box 13 without rotation.

When the drive shaft 39 starts to rotate, for example, counterclockwise in plan view, the right end of the unit base 31 rotates to change the orientation of the display screen to the right.

Then, if the drive shaft 39 is rotated, for example, clockwise in plan view based on a detection result of the photosensor 57, one end (a left end of the unit base 31 in FIG. 11A) of the unit base 31 starts, to move (rotate) forward.

After the one end of the unit base 31 starts to rotate, if the contact between the half punch section 49 and the end portion of the photosensor opening 73 is released, the second slide cover 70 starts to move toward the first slide cover 60 until the downward protruding piece 75 comes into contact with the side surface 13b of the dustproof box 13 by the urging force of the tension spring 55 while the second slide cover 70 covers the upper opening 13c of the dustproof box 13.

As described above, the unit base 31 includes the first and second slide covers 60 and 70 that cover the upper opening 13c of the dustproof box 13, and thus the unit base 31 can prevent dust from entering the dustproof box 13.

Furthermore, in the operations in FIG. 11A and FIG. 11B, the first slide cover 60 that moves in conjunction with the rotation of the unit base 31 and the second slide cover 70 that does not move in conjunction with the rotation of the unit base 31 are separately provided. Consequently, the width (the length in the left-right direction) of the unit base 31 can be shortened as compared with a case in which the first and second slide covers 60 and 70 are provided as a unit, and thus the size of the drive unit 30 can be reduced.

REFERENCE SIGNS LIST

1 STAND
2 DISPLAY APPARATUS
3 BACK SURFACE
4 HOLE
10 BASE SECTION
11 ROTATION SUPPORTING MEMBER
12 FIXED GEAR
12a LEG SECTION
12b TRAPEZOIDAL SECTION
13 DUSTPROOF BOX
13a MOWER SURFACE
13b SIDE SURFACE
13c UPPER OPENING
14 POSITION DETECTION PLATE
20 SUPPORT SECTION
21 SUPPORT BASE
22 INSTALLATION PLATE
30 DRIVE UNIT
31 UNIT BASE
32 UNIT COVER
33 ELECTRIC MOTOR
33a MOTOR HOLDER
34 WORM GEAR
35 FIRST GEAR
35a FIRST LARGE-DIAMETER GEAR
35b FIRST SMALL-DIAMETER GEAR
36 SECOND GEAR
36a SECOND LARGE-DIAMETER GEAR
36b SECOND SMALL-DIAMETER GEAR
37 THIRD GEAR
38 MOVABLE GEAR
39 DRIVE SHAFT
40, 41 BEARINGS
42 BEARING HOLDER
43 COLLAR
45 UPPER SURFACE
46 SLIDE-COVER OPENING
47 LOWER SURFACE
47a PHOTOSENSOR OPENING
48, 49 HALF PUNCH SECTIONS
50 SPRING GUIDE RING
52 FIXING SECTION
54 GUIDE SECTION
55 PRESSING SECTION
55 TENSION SPRING
56 PRINTED CIRCUIT BOARD
57 PHOTOSENSOR
60 FIRST SLIDE COVER
61, 71 HORIZONTAL SURFACE SECTIONS
62, 72 DRIVE-SHAFT OPENINGS
63, 73 PHOTOSENSOR OPENINGS
64, 74 UPWARD PROTRUSIONS
65, 75 DOWNWARD PROTRUDING PIECES
70 SECOND SLIDE COVER

The invention claimed is:

1. A stand used for holding a display apparatus, the stand comprising:
a base section; and a support section configured to rotate with respect to the base section and hold the display apparatus, wherein
the support section includes a drive unit configured to rotate a display screen of the display apparatus,
the drive unit is provided behind a back side of the display screen of the display apparatus,
the drive unit includes a drive shaft, and a movable gear configured to rotate together with the drive shaft,
the base section includes a rotation supporting member configured to support rotatably the display apparatus and a fixed gear configured to mesh with the movable gear,
the movable gear is disposed between the rotation supporting member and the fixed gear, and
the movable gear is provided at a lower end of the drive shaft that extends downward through the drive unit, and at least a lower end side of the movable gear has an arc shape in a cross section including a rotation axis line of the drive shaft.

2. The stand according to claim 1, wherein the drive unit includes an electric motor and the display screen of the display apparatus is rotated by driving the electric motor.

3. A stand used for holding a display apparatus, the stand comprising:
a base section; and a support section configured to rotate with respect to the base section and hold the display apparatus, wherein
the support section includes a drive unit configured to rotate a display screen of the display apparatus,
the drive unit is provided behind a back side of the display screen of the display apparatus,
the drive unit includes a drive shaft, and a movable gear configured to rotate together with the drive shaft,
the base section includes a rotation supporting member configured to support rotatably the display apparatus and a fixed gear configured to mesh with the movable gear,
the fixed gear is disposed between the rotation supporting member and the movable gear, and
the movable gear is provided at a lower end of the drive shaft that extends downward through the drive unit, and at least an upper end side of the movable gear has an arc shape in a cross section passing through a rotation axis line of the drive shaft.

4. A stand used for holding a display apparatus, the stand comprising:
a base section; and a support section configured to rotate with respect to the base section and hold the display apparatus, wherein
the support section includes a drive unit configured to rotate a display screen of the display apparatus,
the drive unit is provided behind a back side of the display screen of the display apparatus,
the drive unit includes a drive shaft, a movable gear configured to rotate together with the drive shaft, and a unit base through which the drive shaft is disposed, the unit base being configured to rotate the display screen of the display apparatus,
the base section includes a fixed gear configured to mesh with the movable gear and a dustproof box that accommodates the movable gear and the fixed gear, and further includes two slide covers each configured to move in conjunction with rotation of the unit base,
when one of the slide covers moves in conjunction with the rotation of the unit base and covers the dustproof box, another one of the slide covers covers the dustproof box without moving in conjunction with the rotation of the unit base.

5. A television apparatus comprising the stand according to claim 1.

6. The stand according to claim 1, wherein
the cross section is perpendicular to a plane perpendicular to the rotation axis line of the drive shaft.

7. The stand according to claim 1, wherein
at least the lower end side of the movable gear has a diameter that decreases toward a lower end of the movable gear.

* * * * *